(12) United States Patent
Häfner et al.

(10) Patent No.: US 9,090,349 B2
(45) Date of Patent: Jul. 28, 2015

(54) BEARING APPLICATION FOR FASTENING STEP FLIGHTS IN AN AIRCRAFT

(75) Inventors: Christine Häfner, Zwickau (DE); Bernd Beschorner, Weihe (DE); Frank Werth, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 1044 days.

(21) Appl. No.: 12/595,228

(22) PCT Filed: Apr. 17, 2008

(86) PCT No.: PCT/EP2008/054683
§ 371 (c)(1),
(2), (4) Date: Apr. 26, 2010

(87) PCT Pub. No.: WO2008/128969
PCT Pub. Date: Oct. 30, 2008

(65) Prior Publication Data
US 2010/0206984 A1 Aug. 19, 2010

Related U.S. Application Data

(60) Provisional application No. 60/912,648, filed on Apr. 18, 2007.

(30) Foreign Application Priority Data
Apr. 18, 2007 (DE) .................. 10 2007 018 326

(51) Int. Cl.
*B64D 11/00* (2006.01)
*B64C 1/00* (2006.01)
*E04F 11/00* (2006.01)

(52) U.S. Cl.
CPC ......... *B64D 11/00* (2013.01); *B64C 2001/0027* (2013.01); *E04F 11/00* (2013.01); *Y02T 50/46* (2013.01)

(58) Field of Classification Search
USPC ................. 244/118.5, 129.6; 52/183, 187; 105/449, 443; 182/97
See application file for complete search history.

(56) References Cited

U.S. PATENT DOCUMENTS

| | | | |
|---|---|---|---|
| 4,022,404 | A | 5/1977 | Greiss |
| 4,035,861 | A | 7/1977 | Edge |

(Continued)

FOREIGN PATENT DOCUMENTS

| | | |
|---|---|---|
| DE | 100 26 289 A1 | 12/2001 |
| DE | 20 2004 02096 U1 | 6/2006 |

(Continued)

OTHER PUBLICATIONS

PCT International Search Report and Written Opinion, PCT Application No. PCT/EP2008/054683, Sep. 17, 2008, 9 pages.
Japanese Office Action, Japanese Application No. 2010-503504, Sep. 18, 2012, 6 pages.
Russian Decision to Grant, Russian Application No. 2009132958/11(046243), 2012, 12 pages.
Chinese First Office Action, Chinese Application No. 200880012604.0, Dec. 26, 2011, 8 pages.

*Primary Examiner* — Brian M O'Hara
(74) *Attorney, Agent, or Firm* — Fenwick & West LLP

(57) ABSTRACT

The invention relates to a bearing application for staircases in an aircraft with at least two decks. According to the invention at least two bearings, each with at least partially different possibilities of movement about and along or parallel to the x-axis, y-axis and z-axis of a system of coordinates, are arranged on each staircase at the lower and upper staircase end (rotatory and/or translational movements). Due to the presence of at least four bearings on each staircase, the relative movements between decks can be compensated for. Consequently the static design of the staircases can be limited to the intrinsic weight and operation-related loads by the mass of the users, thereby providing weight savings.

14 Claims, 3 Drawing Sheets

(56) References Cited

U.S. PATENT DOCUMENTS

| | | |
|---|---|---|
| 4,066,227 A | 1/1978 | Buchsel |
| 4,796,837 A * | 1/1989 | Dowd .................. 244/122 R |
| 5,108,048 A * | 4/1992 | Chang .................. 244/118.1 |
| 5,115,999 A | 5/1992 | Buchsel et al. |
| 6,581,876 B2 * | 6/2003 | Cheung ................. 244/118.5 |
| 6,659,225 B2 * | 12/2003 | Olliges et al. ............ 182/97 |
| 6,814,522 B1 * | 11/2004 | Daniel, III .............. 403/162 |
| 6,848,654 B1 * | 2/2005 | Mills et al. ............. 244/118.5 |
| 2005/0178909 A1 * | 8/2005 | Mills .................. 244/118.6 |
| 2005/0247520 A1 | 11/2005 | Guering |
| 2009/0250554 A1 * | 10/2009 | Graeber et al. .......... 244/120 |

FOREIGN PATENT DOCUMENTS

| | | |
|---|---|---|
| EP | 0373529 A2 | 6/1990 |
| EP | 1279593 A2 | 1/2003 |
| EP | 1452443 A | 9/2004 |
| SU | 126372 A1 | 1/1960 |
| WO | WO 2004/076280 A1 | 9/2004 |

\* cited by examiner

BEARING APPLICATION FOR FASTENING STEP FLIGHTS IN AN AIRCRAFT

FIELD OF THE INVENTION

The invention relates to a bearing application for fastening staircases, in particular a cockpit staircase, a front staircase and a rear staircase in an aircraft, wherein the staircases connect at least two decks.

In aircrafts with more than one passenger deck the passenger decks must be connected to each other by staircases to ensure accessibility to all decks at any time. Prior art embodiments of bearing applications for fastening staircases to the aircraft decks are of rigid design. This means that any movements of the decks relative to each other, resulting for example from manoeuvre-induced fuselage deformations, cannot be compensated for by the staircase fastening. Such relative movements are generally compensated for by a sufficiently elastic design of the staircases to avoid introducing loads from the primary structure into the staircase.

In addition, tolerance equalisation in the case of production deviations is only possible at high cost where there is a rigid fastening of the staircases between the decks.

SUMMARY OF THE INVENTION

The object of the invention is to provide a moving bearing application for a staircase in an aircraft between two decks in order to compensate for any movements of the decks relative to each other and largely avoid the introduction of external loads from the primary structure into the staircase.

This object is achieved by a bearing application with the features of Claim 1.

Because the staircase is supported in a floating manner between at least two decks, in order to compensate for relative movements of the decks due to fuselage movements of the aircraft, the staircase is not additionally loaded with external loads from the primary structure resulting, for example, from manoeuvre-induced fuselage deformations.

Consequently the staircase must only support the function-dependent loads which are generated essentially by passengers combined with the natural mass of the staircases.

A structurally expensive and weight increasing elastic design of the staircase stringers and/or steps is no longer required to compensate for any movements of the decks relative to each other. Here the inventive bearing application is not dependent on the staircase shape or staircase geometry and can be used equally, for example, for "straight" staircases, spiral staircases or other staircase shapes.

The inventive bearing application is preferably constructed slightly differently in the longitudinal direction of the fuselage, as a function of the installation position, since the fuselage deformations occurring in the cockpit region, in the front fuselage section and in the tail section each result in different grades of deformation. Thus the fuselage deformations, and hence also the relative movements of the decks to be compensated for, are greatest in the cockpit region of the fuselage cell, whilst the degree of deformations in the direction of the tail section of the fuselage cell is reduced. The size of the relative movements in the front fuselage section attains intermediate values. Consequently the inventive bearing application is designed for a staircase arranged in the cockpit region in the most articulated and mobile manner, whilst the bearing application of the staircase in the tail region is considerably less mobile. the bearing application of the front staircase assumes a central position in terms of articulation.

According to an advantageous design of the bearing application at least two bearings are provided on both ends of each staircase.

Because of the total of four bearings, which are arranged essentially in the corner regions of the staircase, a secure connection of the sep to the upper deck and the lower deck is achieved, so that distortions cannot occur.

Moreover, a safe "grip" is provided for passengers climbing the staircase. Regardless of the inventive "floating" support of the staircases, the user does not have the feeling that the staircases are swaying whilst walking on them or that they are changing their spatial position substantially—apart from a slight load-dependent deflection.

In the case of staircases for connecting more than two decks and/or steps with large longitudinal dimensions, it may be necessary to increase the number of bearings and to arrange further bearings as support, for example in a central section of the staircase.

Further advantageous designs of the staircase bearing application between the decks in multi-deck aircraft are explained in the further claims.

DETAILED DESCRIPTION OF THE DRAWINGS

Figure 1:
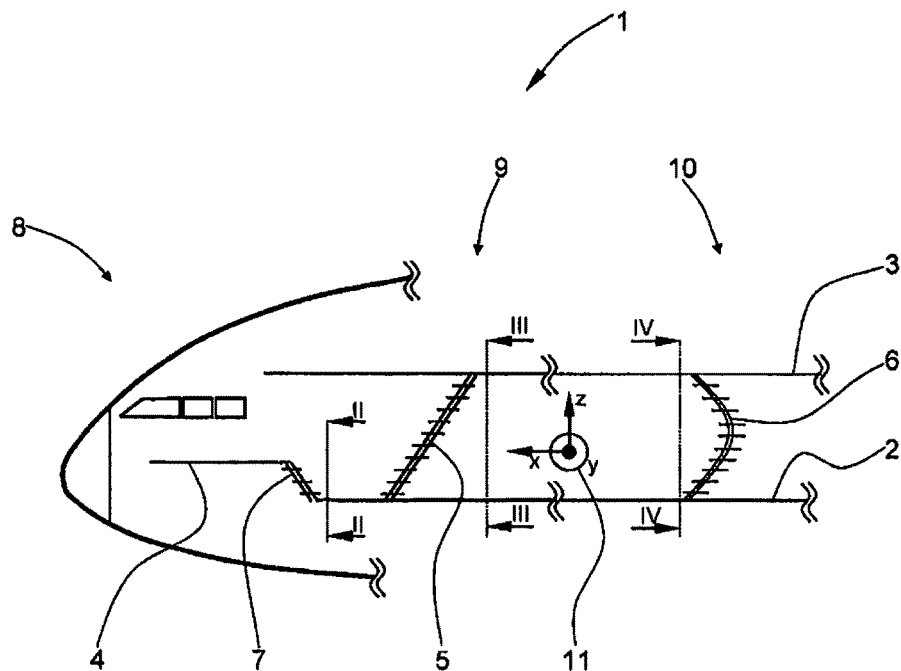
FIG. 1 shows a diagrammatic side view of a double-deck aircraft with a cockpit region with additional cockpit deck, a front fuselage section and a tail section, each with a staircase supported according to the invention.

In the drawing the same structural elements are each assigned the same reference numbers.

FIG. 1 shows a side view of a double-deck aircraft with three staircases connected by means of the inventive bearing application between two decks.

Double-deck aircraft 1 has, among other things, a lower deck 2, an upper deck 3 and an additional cockpit deck 4.

A front staircase 5 and a rear staircase 6 serve to make a connection, which is walkable, particularly by the passengers, between lower deck 2 and upper deck 3, whilst a cockpit staircase 7 serves to access to a cockpit region 8 of aircraft 1 from lower deck 2 for the crew members. Staircases 5, 7 are designed as conventional "straight" staircases, whilst staircase 6 is a decorative spiral staircase.

Regardless of their geometrical shape, staircases 5 to 7 are each connected to corresponding decks 2 to 4 of aircraft 1 by means of the inventive bearing application in the region of the lower and upper staircase end. However, the degree of mobility of the bearing applications staircases 5 to 7 varies, preferably as a function of the site of installation of each staircase 5 to 7 in relation to the longitudinal extension of the fuselage cell of aircraft 1 (x-axis).

For the fuselage deformations of the aircraft are greatest in the region of cockpit 8 and in a front fuselage section 9, whilst the deformations in a rear fuselage section 10 generally turn out to be smaller. Consequently the inventive bearing application in cockpit region 8 and in front fuselage section 9 must allow the greatest mobility or compensation capability. These fuselage deformations of aircraft 1 are generated essentially by flight manoeuvres and/or external aerodynamic loads, squalls for example.

The orientation in space is represented in all the figures by the system of coordinates 11. Furthermore, the symbols used in FIGS. 2 to 4 for the bearings are identical.

Figure 2:
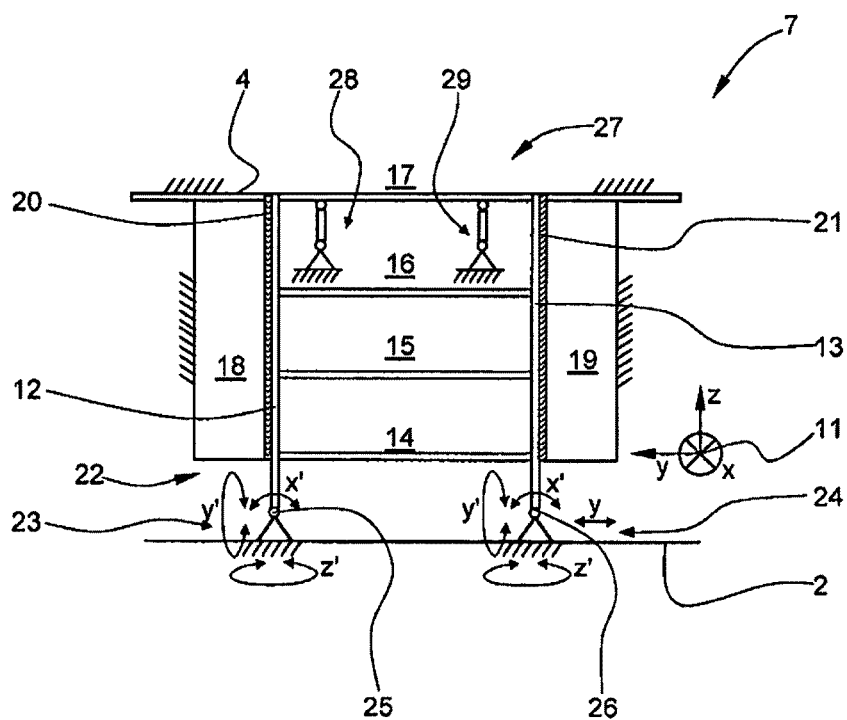
FIG. 2 shows a view of the cockpit staircase from the direction of the arrows on line II-II in FIG. 1.

FIG. 2 shows a view of cockpit staircase 7, viewed from the direction of the arrows on line II-II in FIG. 1 (in the direction of flying or in the direction of the x-axis).

Cockpit staircase 7 has two staircase stringers 7 between which are arranged four steps 14 to 17. Uppermost step 17 is designed separately in the exemplary embodiment shown, i.e. step 17 (exit) is arranged like lower steps 14 to 16 between stringers 12, 13. Alternatively the separate step 17 may be omitted and replaced by an extension of cockpit deck 4 in this region (so-called platform). This design facilitates the sealing of cockpit staircase 7 against moisture forming at the top. This design is also advantageous in the case of the other staircases 5, 6.

To seal cockpit staircase 7 against laterally adjacent components 18, 19, seals 20, 21 or sealing strips may be arranged in certain regions on staircase stringers 12, 13.

Linear lighting elements may preferably be integrated in the front edges of steps 14 to 17 in order to improve safety for users in the dark. The lighting elements preferably have emergency lighting characteristics if no on-board power supply is available. A lower staircase end 22 has two lower bearings 23, 24, which form the articulated connection to lower deck 2. Lower bearings 23, 24 are designed so that the capacity for swivelling or rotation about the x-axis, the y-axis and the z-axis of the system of coordinates 11 or swivelling or rotation axes running parallel with them is provided. This swivelling capacity of the two bearings 22, 23 is symbolised for each of them with three double arrows x', y', z'. The left lower bearing 23 cannot absorb any translational movements, i.e. displacements parallel with the x-axis, the y-axis and the z-axis of the system of coordinates 11. The right lower bearing 24 cannot be displaced parallel with the x-axis and the z-axis except for a displaceability parallel with the y-axis—as indicated by the double arrow designated y, i.e. it is connected fixedly to lower deck 2. Bearings 23, 24 each have a rocker bearing 25, 26 which allows the mobilities mentioned. In addition, right bearing 24 must have a linear sliding bearing to achieve the displaceability parallel with the y-axis. An exemplary embodiment for this type of joint is explained in further detail in connection with the description of FIG. 5. In principle the inventive staircase bearing application can be constructed with standard industrial bearings as long as they have the mobilities mentioned.

At an upper staircase end 27 there are two upper bearings 28, 29, by means of which the articulated connection of the staircase 7 to cockpit deck 4 is achieved. Bearings 28, 29 each independently provide a capacity for swivelling about the x-axis, the y-axis and the z-axis. With regard to translational movements, i.e. displacements parallel with the x-axis, the y-axis and the z-axis of the system of coordinates 11, bearings 28, 29 are fixed, however. Unlike lower bearings 23, 24, the two upper bearings 28, 29 have two rocker bearings not provided with a reference number, for better clarity of the drawing, which bearings are connected by so-called "rods", as a result of which the degree of freedom of bearings 28, 29 at the upper staircase end 27 is higher than the degree of freedom of bearings 23, 24 at the lower staircase end 22. An exemplary embodiment for the design of such bearings 28, 29 is also explained in further detail below in connection with the description of FIG. 6.

Figure 3:
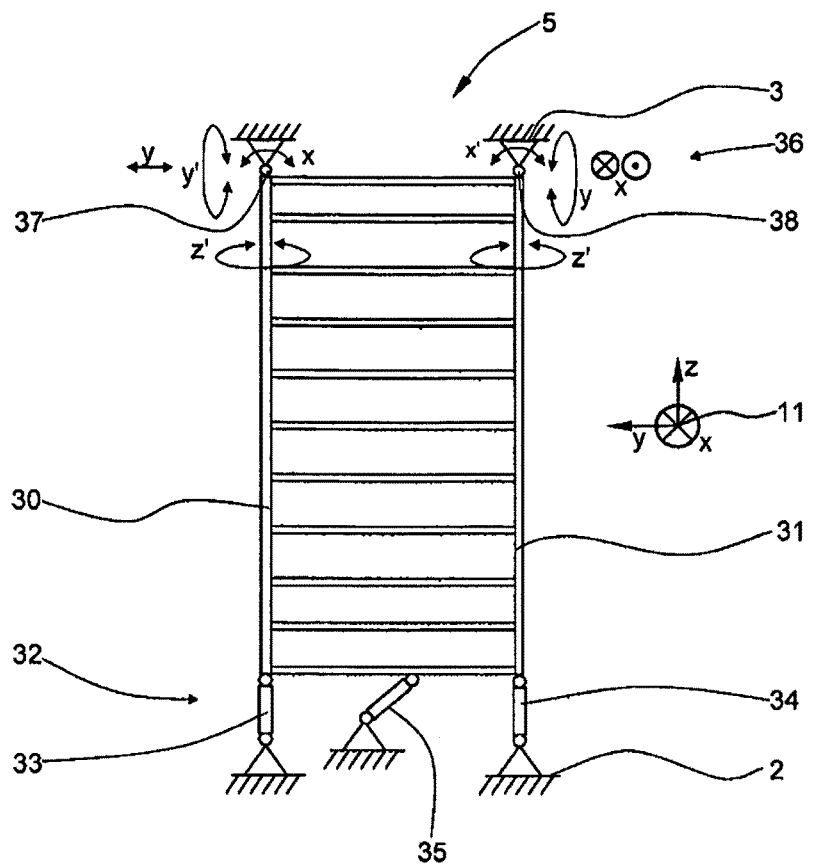
FIG. 3 shows a view of the front staircase from the direction of the arrows on line III-III in FIG. 1.

FIG. 3 shows a view of front staircase 5 from the direction of the arrows on line III-III in FIG. 1 (view from behind in the direction of flight).

Front staircase 5 has two staircase stringers 30, 31 between which is arranged a multiplicity of steps, not described in further detail. At lower staircase end 32 staircase 5 is connected by means of lower bearings 33, 34 to lower deck 2. Lower bearings 33, 34 have the same structure as upper bearings 28, 29 of cockpit staircase 7. Both bearings therefore allow swivelling and rotational movements about the x-axis, the y-axis and the z-axis of the system of coordinates 11. With regard to pure (translational) sliding movements of lower staircase end 32 parallel with the x-axis, the y-axis or the z-axis, lower bearings 33, 34 are fixed. Furthermore, a transverse stabiliser 35 is arranged between the two lower bearings 33, 34 in order to damp, in particular, swivelling movements of lower staircase end 32 in the direction of the y-axis. Transverse stabiliser 35 is arranged at an angle of 45°. Regardless of the "floating" bearing arrangement, the user of the staircase is not given the feeling of not having a safe, firm step.

Furthermore, an upper staircase end 36 of front staircase 5 is connected with two upper bearings 37, 38 to upper deck 3. The structure of the two upper bearings 37, 38 and transverse stabiliser 35 corresponds in turn to the structure of lower bearings 23, 24 of cockpit staircase 7. The two other bearings 37, 38 may be rotated or swivelled about all three axes of the system of coordinates 11. In addition, left upper bearing 37 has a translational movability parallel with the y-axis and right upper bearing 38 is displaceable parallel with the z-axis (perpendicular to the drawing plane). With respect to all further sliding movements along the other axes off the system of coordinates 11, upper bearings 37, 38 are fixed.

Sufficient articulation of the connection of front staircase 5 is provided by the four bearings 33, 34 and 37, 38, each with different movement possibilities, in order to be able to compensate for all relative movements between lower deck 2 and upper deck 3, yet still guarantee a firm step for the users. In this case the bearing arrangement of front staircase 5 achieves approximately the same mobility and flexibility as the bearing arrangement of cockpit staircase 7. Front staircase 5 may have seals in the region of stringers 30, 31 in order to guarantee sealing against adjacent components.

Figure 4:
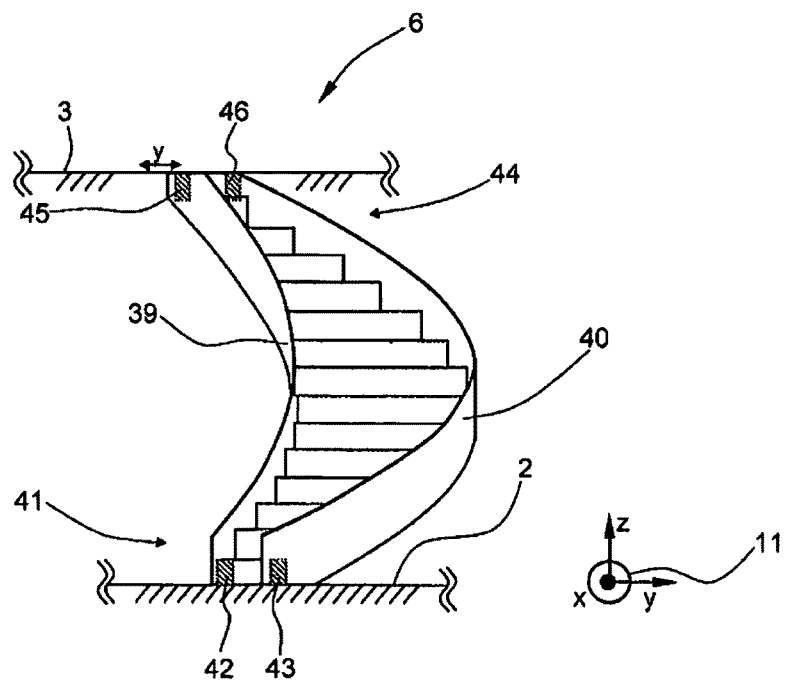
FIG. 4 shows a view of the rear (spiral) staircase from the direction of the arrows on line IV-IV in FIG. 1.

FIG. 4 shows a view of the rear spiral staircase in the direction of the arrows along line IV-IV in FIG. 1.

Rear staircase 6, unlike staircases 5, 7, is not a "straight" staircase but a "spiral staircase" with two spiral staircase stringers 39, 40, between which are arranged a multiplicity of steps which are not provided with a reference number for clarity in the drawing. At a lower staircase end 41 are arranged two bearings 42, 43 for connecting staircase 6 to lower deck 2, and an upper staircase end 44 has two bearings 45, 46 for connection to upper deck 3.

Lower bearings 42, 43 are formed with a plurality of clamping bolts which can be fastened in lower deck 2 in two seat rails, not shown. Each bearing 42, 43 preferably has two clamping bolts. The seat rails are profiles used as standard in aviation, with an approximately U-shaped cross-sectional geometry, in which the clamping bolts can be fixed at framed intervals of approx. 2.54 cm, for example. Upper bearings 45, 46 can be formed with fork-shaped brackets secured to upper deck 3, which brackets are in turn rigid in the region of upper staircase end 44, and if necessary connected by intermediate elements with setting possibilities for tolerance equalisation with rear staircase 6.

Unlike the bearing arrangements described above, the two lower bearings 42, 43 and upper bearing 46 are designed immovably, i.e. rotary movements and/or translational movements of staircase 6 in the three bearings 42, 43, 46 about the axes and/or parallel with the axes of the system of coordinates 11, are not possible. Only left upper bearing 45 is designed so that it can be displaced parallel with the y-axis of system of coordinates 1. Moreover, bearing 45 also represents a fixed connection between upper deck 3 and rear staircase 6. This lower mobility, compared to the bearing arrangements described above, is not detrimental because smaller fuselage deformations normally occur in the tail region of an aircraft between lower deck 2 and upper deck 3 compared to the front fuselage section.

On the one hand, rear staircase 6 is of a spiral design, for aesthetic reasons, and on the other hand the spiral design of staircase 6 allows a space-saving arrangement compared to a straight running staircase. Moreover, the spiral design allows higher flexibility of staircase stringers 39, 40, which are therefore more easily capable of absorbing relative movements between lower deck 2 and upper deck 3. In addition, staircase stringers 39, 40 are designed elastically, at least in sections, in order to reinforce the effect of the spiralling.

Figure 5:
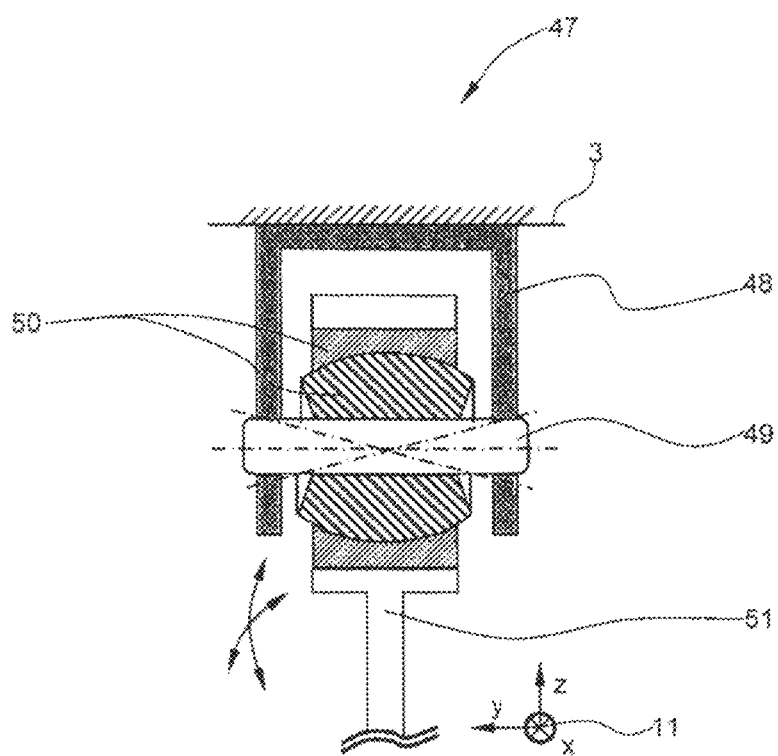
FIG. 5 shows an exemplary embodiment of a bearing with a single rocker bearing.

FIG. 5 shows an exemplary embodiment of a bearing with a "single" rocker bearing to form a bearing for one of the staircases described above.

A bearing 47 has, among other things, a fork-shaped bracket by means of which bearing 47 is fastened to upper deck 3, for example. A rocker bearing 50 is connected to the fork-shaped bracket 48 by means of a retaining bolt 49. Rocker bearing 50 is in turn received in an eye head 51. Rocker bearing 50, designed in an essentially spherical shape, allows swivelling movements about the x-axis and z-axis. Because of the bearing arrangement of rocker bearing 50 on retaining bolt 49, the capacity to swivel or rotate about the y-axis of the system of coordinates 11 is also possible. Bearing 47 is connected to a staircase end by means of eye head 51. Bearing 47 also has locking elements (locking rings, shims, intermediate bearings, etc.), not shown, by means of which the axial clearance (for example, parallel with the y-axis) is limited to predetermined values if no translational movability is required in bearing 47. To achieve movability parallel with the x-axis, an additional sliding joint may be provided between bracket 48 and upper deck 3.

For example, if bearing 47 is to allow displaceability parallel with the y-axis in addition to the capacity to swivel about the three axes, rocker bearing 50 may, for example, be arranged displaceably by the desired length amount on retaining bolt 49. Bearing 47 may, for example, be used to connect upper bearings 37 to front staircase 5 (cf. FIG. 3). Eye head 51 has devices, not shown, for allowing a longitudinal adjustment in the direction of the z-axis in order to be able compensate, for example, for production-related component tolerances when installing the staircases. Rocker bearing 50 is preferably lubricated for life.

Figure 6:
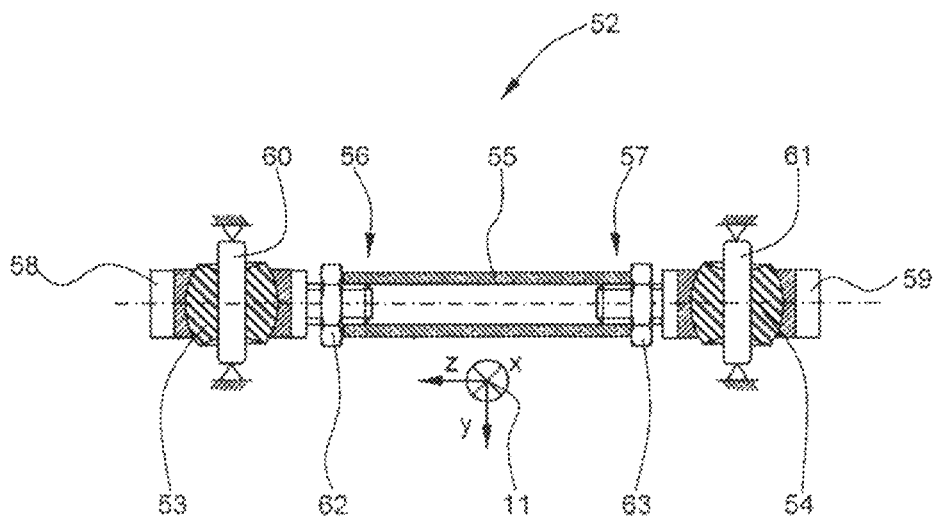
FIG. 6 shows an exemplary embodiment of a bearing with a double rocker bearing.

FIG. 6 shows a possible embodiment of a bearing as a double joint.

A bearing 52 comprises, among other things, two rocker bearings 53, 54, which are constructed correspondingly to rocker bearing 50 (cf. FIG. 5). Rocker bearings 53, 54 in turn comprise spherical calottes which are possibly received, at least in certain regions, in correspondingly designed spherical pan. Each rocker bearing 53, 54 allows swivel movements about the x-axis, the y-axis and the z-axis of the system of coordinates 11. Rocker bearings 53, 54 are connected in the exemplary embodiment shown by a hollow cylindrical rod 55 whose ends 56, 57 are provided with a female thread (left- and right-hand thread) designed preferably in opposite directions.

Both ends 56, 57 of rod 55, unlike the representation shown in the drawing, are preferably of a tapered design. An eye head 58, 59 is screwed into each of ends 56, 57, in which head one of rocker bearings 53, 54 is pivotably received. A staircase is connected, in the region of the first end 56 of rod 55, to a retaining bolt 60, which is connected by means of a bracket, not shown, to one of decks 2 to 4. The other end 57 of rod 55 is connected to one staircase end of staircases 5 to 7 to be supported by means of a retaining bolt 61, which is in turn received in a bracket, not shown.

In this case the mobilities (rotations and displaceabilities about or along the three axes in space) of the individual bearings are selected in particular as a function of the installation position of staircases 5 to 7, according to the basic positions explained in connection with the description of Gigs. 1 to 4. In principle the bearings with different mobilities can be combined with each other in any manner.

The longitudinal adjustment of bearing 52 for tolerance equalisation of production-related dimensional deviations is carried out by rotating hollow cylindrical rod 55 about its longitudinal axis, i.e. about the z-axis of the system of coordinates 11. The longitudinal adjustment can be protected against unintentional variations, for example, with two lock nuts 62, 63 or with other locking means (locking pins, locking clips, etc.). The two lower bearings 33, 34 and transverse stabiliser 35 of front staircase 5, as well as upper bearings 28, 29 of cockpit staircase 7, are preferably designed in correspondence with bearing 52 described above (cf. FIG. 3).

The embodiments of bearings 47, 52 shown diagrammatically in FIGS. 5, 6, only represent one possible design of many design alternatives. In the context of the floating bearing arrangement of staircases in double- or multi-deck aircraft, any standard industrial joints may be used, but they must have the movement possibilities (degrees of freedom) required according to the invention.

The inventive staircase bearing application is not limited to applications in passenger aircraft. On the contrary, the floating bearing arrangement of staircases may be used for connecting several decks in aircraft of any kind, in particular also in pure (native) freight aircraft or transporters, or in freight versions of passenger aircraft.

| LIST OF REFERENCE NUMERALS | |
|---|---|
| 1 | Aircraft |
| 2 | Lower deck |
| 3 | Upper deck |
| 4 | Cockpit deck |
| 5 | Front staircase |
| 6 | Rear staircase |
| 7 | Cockpit staircase |
| 8 | Cockpit |
| 9 | Front fuselage section |
| 10 | Rear fuselage section |
| 11 | System of coordinates |
| 12 | Staircase stringer |
| 13 | Staircase stringer |
| 14 | Step |
| 15 | Step |
| 16 | Step |
| 17 | Step |
| 18 | Component |
| 19 | Component |
| 20 | Seal |
| 21 | Seal |
| 22 | Lower staircase end |
| 23 | Lower bearing |
| 24 | Lower bearing |
| 25 | Rocker bearing |

-continued

LIST OF REFERENCE NUMERALS

| | |
|---|---|
| 26 | Rocker bearing |
| 27 | Upper staircase end |
| 28 | Upper bearing |
| 29 | Upper bearing |
| 30 | Staircase stringer |
| 31 | Staircase stringer |
| 32 | Lower staircase end |
| 33 | Lower bearing |
| 34 | Lower bearing |
| 35 | Transverse stabiliser |
| 36 | Upper staircase end |
| 37 | Upper bearing |
| 38 | Upper bearing |
| 39 | Staircase stringer |
| 40 | Staircase stringer |
| 41 | Lower staircase end |
| 42 | Lower bearing |
| 43 | Lower bearing |
| 44 | Upper staircase end |
| 45 | Upper bearing |
| 46 | Upper bearing |
| 47 | Bearing |
| 48 | Fork-shaped bracket |
| 49 | Retaining bolt |
| 50 | Rocker bearing |
| 51 | Eye head |
| 52 | Bearing |
| 53 | Rocker bearing |
| 54 | Rocker bearing |
| 55 | Hollow cylindrical rod |
| 56 | End |
| 57 | End |
| 58 | Eye head |
| 59 | Eye head |
| 60 | Retaining bolt |
| 61 | Retaining bolt |
| 62 | Lock nut |
| 63 | Lock nut |

The invention claimed is:

1. A staircase in an aircraft, wherein the staircase connects at least two decks and the staircase comprises:
 a lower staircase end; and
 an upper staircase end,
 wherein the lower staircase end has at least two lower bearings which connect to a lower deck, and the upper staircase end has at least two upper bearings which connect to an upper deck, the lower deck and the upper deck being subject to movements relative to each other during fuselage deformations of the aircraft;
 wherein the lower and upper bearings of the staircase are rotatable about an x-axis, a y-axis and a z-axis to compensate for said movements of the lower and upper decks.

2. The staircase according to claim 1, wherein the upper bearings of the staircase are translationally fixed relative to the x-axis, the y-axis and the z-axis.

3. The staircase according to claim 2, wherein the upper bearings each comprises two rocker bearings which are each received in an eye head, and wherein the eye heads are screwed on both sides into a rod and the rocker bearings are each rotatable about the x-axis, the y-axis and the z-axis.

4. The staircase according to claim 2, The staircase according to claim 2, wherein one of the lower bearings is translationally fixed relative to the x-axis, the y-axis and the z-axis, and wherein another one of the lower bearings is translationally fixed relative to the x-axis and the z-axis.

5. The staircase according to claim 2, wherein the lower bearings each have a rocker bearing received in an eye head, wherein the rocker bearings are rotatable about the x-axis, the y-axis and the z-axis.

6. The staircase according to claim 2, wherein at least one staircase stringer is provided, at least in certain regions, with a seal against at least one component adjacent to the staircase.

7. A staircase according to claim 1, wherein one of the upper bearings of the staircase is translationally fixed relative to the x-axis and the z-axis, and the other upper bearing is translationally fixed relative to the y-axis and the z-axis.

8. The staircase according to claim 7, wherein the two lower bearings are translationally fixed relative to the x-axis, the y-axis and the z-axis.

9. The staircase according to claim 7, wherein the lower bearings each has two rocker bearings which are each received in an eye head, and wherein the eye heads are screwed on both sides into a rod and the rocker bearings are each rotatable about the x-axis, the y-axis and the z-axis.

10. The staircase according to claim 7, wherein at least one transverse stabilizer is arranged between the lower bearings in order to limit lateral movements of the staircase, wherein the transverse stabilizer has two rocker bearings which are each received in an eye head and the eye heads are screwed on both sides into a rod and the rocker bearings are each rotatable about the x-axis, the y-axis and the z-axis.

11. The staircase according to claim 10, wherein the rod has a hollow-cylindrical central section to which tapered ends with a female thread connect on both sides.

12. The staircase according to claim 11, wherein the female threads are formed in opposite directions, respectively in the ends of the rod to allow a longitudinal adjustment by rotation of the rod about its longitudinal axis, wherein a rotational lock is provided by two lock nuts.

13. A staircase in an aircraft, wherein the staircase connects at least two decks and the staircase comprises:
 a lower staircase end; and
 an upper staircase end,
 wherein the lower staircase end has at least two lower bearings which connect to a lower deck, and the upper staircase end has at least two upper bearings which connect to an upper deck, the lower deck and the upper deck being subject to movements relative to each other during fuselage deformations of the aircraft;
 wherein one of the upper bearings of the staircase is fixedly connected to the upper deck, and another one of the upper bearings is movable parallel to a y-axis and otherwise fixedly connected to the upper deck, and
 wherein the two lower bearings are each fixedly connected to the lower deck.

14. The staircase according to claim 13, wherein the lower bearings of the staircase are fixedly connected to at least one seat rail in the lower deck.

* * * * *